United States Patent Office 3,161,704
Patented Dec. 15, 1964

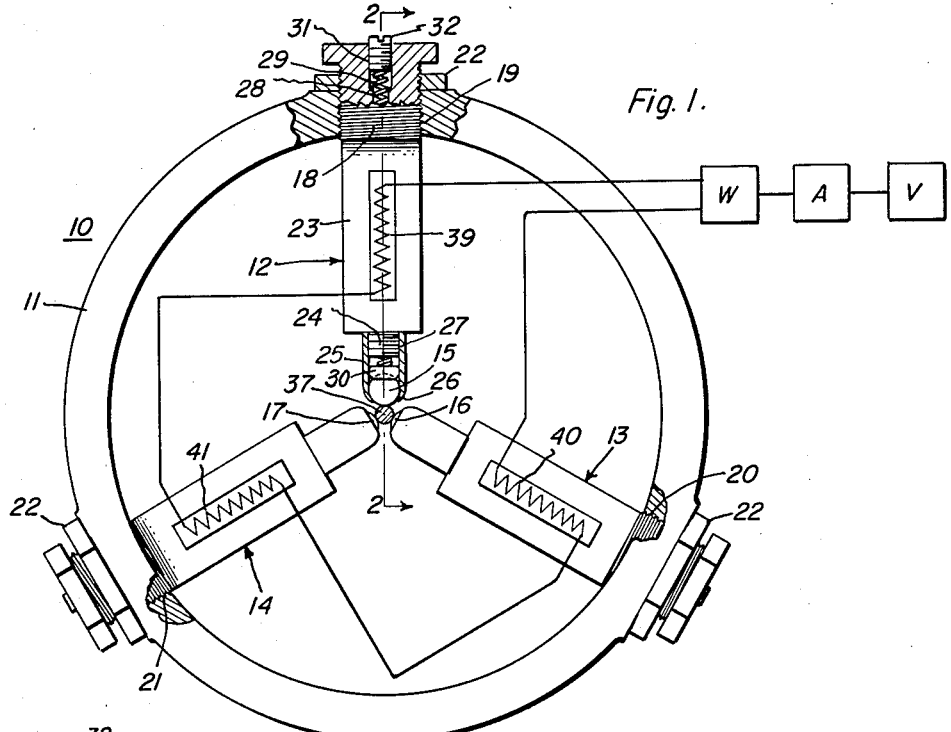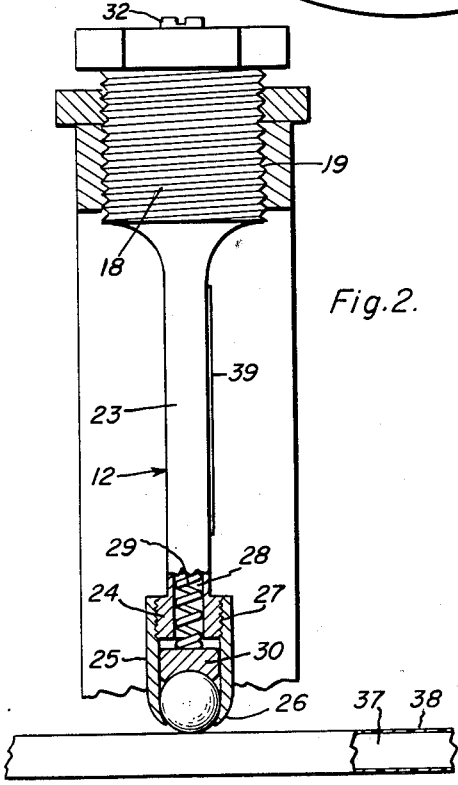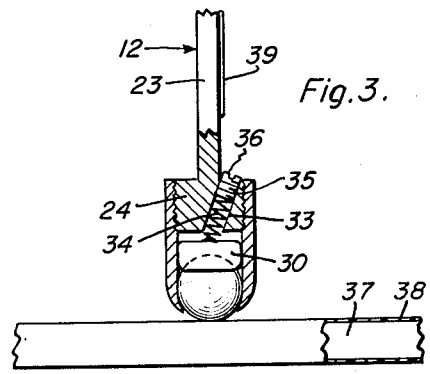
Inventors:
Donald G. LeGrand;
Donald G. Flom,
by *James J. Lichiello*
Their Attorney.

3,161,704
TESTING DEVICE AND USE IN PROCESS CONTROL
Donald G. Le Grand, Scotia, N.Y., and Donald G. Flom, Berwyn, Pa., assignors to General Electric Company, a corporation of New York
Filed Sept. 12, 1962, Ser. No. 223,166
8 Claims. (Cl. 264—40)

This invention relates to a testing device and more particularly to surface testing devices which utilize rolling friction between a specimen or material to be tested and an element in the testing device to determine, as a function of rolling friction, certain surface characteristics of the material, such as for example, smoothness, state of cure, etc.

Numerous testing devices are available and known in the art to test various surface characteristics of a given material. Such testing apparatuses find wide application in the electrical wire and cable field where they are utilized to determine many essential characteristics of the insulating and coating materials employed. Among the newer types of wire insulation materials are those which require some heat treatment for curing purposes. For example, these insulation materials generally include polymers as polyethylene, silicone rubber, ethylene-propylene copolymers; butyl and neoprene elastomers. These materials are ordinarily subjected to a curing process including a heat treatment which requires particular control of temperature and time variables. Accordingly, a coated wire for example, moving out of or from a heat curing treatment may be continually tested by a suitable testing device for variations from predetermined standards of the insulating or coating materials. Since such testing may take place over short intervals of time and on the same continuous length of wire, it is desirable that the testing device itself not injuriously affect the wire being tested. For example, it is understood that any testing method which would require abrasion or cutting of the coating is undesirable in a continual wire curing process.

Accordingly, it is an object of this invention to provide an improved testing device.

It is yet another object of this invention to provide an improved surface testing device which avoids injury to the material to be tested.

It is another object of this invention to provide an improved testing device operative on the rolling friction principle that is a function of specific material characteristics.

It is yet another object of this invention to provide an improved electrical wire insulation coating testing device operative on rolling friction to control the time and temperature variable in a heat curing process.

Briefly described in one embodiment of this invention, a material to be tested moves in contact with a rolling friction element which is supported by a beam member. Rolling friction between the material and the rolling element causes a stress or bending moment in the beam member. The degree of stress or bending moment is directly proportional to certain characteristics of the material and also to the velocity of the material past the rolling element.

One preferred application of this invention relates to the testing of the "state of cure" of heat cured insulating materials on electrical wires. In this aspect of the invention the coated wire to be tested moves from a curing process and thereafter between a plurality of equally peripherally spaced rolling elements. Indicating means are provided to measure the stress or bending moment in the beam members as a function of the state of cure of the coating, and the indiacting means are further utilized to control the curing process.

This invention will be better understood when taken in connection with the following description and drawing in which:

FIG. 1 illustrates one preferred embodiment of this invention;

FIG. 2 is an illustration of one of the beam members of FIG. 1; and

FIG. 3 is an illustration of a modified beam member.

The use of rolling friction between a testing element and a given surface is a preferred means of determining certain characteristics of the given surface relating to dynamic losses. Rolling friction is directly dependent on the dynamic mechanical losses in the given surface material and the speed of the surface material. Additionally, rolling friction is relatively insensitive to atmospheric and surface conditions, for example roughness, cleanliness, or lubricants, which greatly affect sliding friction. The dynamic losses may be correlated to certain characteristics in the given surface material, for example, the state of cure of an insulating coating such as a silicone rubber on electrical wires. Therefor the testing method and apparatus of this invention may be utilized in conjunction with material treating processes to control various parameters thereof.

Referring now to FIG. 1, as one preferred embodiment of this invention, the testing device 10 includes a base or supporting member in the form of an annulus 11. Annulus 11 has positioned therein a plurality of flexible beam members 12, 13 and 14 which retain rolling friction elements in the form of balls 15, 16 and 17 at the inner ends thereof. The rolling elements also may take the form of rollers, barrel rollers, wheel-like elements, etc., the criterion being that rolling contact in some form is established. Each flexible beam member is of a material of predetermined flexure properties, for example a relatively flat or strip form of metal having greater flexibility in one direction than in a direction 90° removed therefrom. A more particular description of a beam member 12 is given with respect to FIG. 2 where a description of one of the beam members 12 suffices as a description for the other similar members 13 and 14.

In FIG. 2, beam member 12 is suitably attached by various known means to annulus 11. One such means includes a threaded cylindrical portion 18 adapted to engage similarly threaded openings 19, 20 and 21 of annulus 11. By this arrangement, member 12 is positioned in annulus 11 so that the penetration of beam 12 to and from the center point of annulus 11 may be controlled and adjusted. Furthermore, the replacement of beam member 12 or other substitutions is also facilitated. To prevent unwanted rotation of the beam members at threaded portions 18, a suitable lock nut 22 is employed. Beam member 12 also includes a flexible shank portion 23 of predetermined flexibility, to a greater degree in, for example, the fore and aft direction, into and out of the plane of the paper as taken from FIG. 1. In practice this flexibility is of only a few thousandths of an inch displacement of the rolling element along the surface to be tested. Thus, beam members 12, 13 and 14 may be of various materials both metal and non metals.

The shank portion of beam 12 also includes means to attach the rolling element 15 thereto. For example, a suitable threaded portion 24 is affixed to shank 23 at the lower end thereof. A tubular member 25 has an inside diameter which closely fits the diameter of the ball 15 and a partially enclosing portion 26. A ball thus placed within the tube rests against portion 26 with a part of the ball projecting therefrom. The tube 25, containing ball 15, is thus threaded to threaded portion 24 of shank 22 by means of its threaded portion 27. Various size balls may thus be substituted by changing tube 25 to other tubes having different inside diameters but similar threaded portions 27.

In order to adjustably control the normal force acting between ball 15 and the specimen to be tested, ball 15 includes biasing means incorporated in beam 12. In this respect, beam 12 includes a central aperture 28, above ball 15, in which there is positioned biasing means in the form of for example a spring 29. Spring 29 bears upon a suitable washer member 30 adjacent ball 15 in the tube portion 25 of beam 12, and, in the upper portion of beam 12 a threaded section 31 permits the insertion therein of an adjusting screw 32. Screw 32 therefor permits adjustment of compression on spring 29 and consequently the normal force between ball 15 and the surface to be tested.

An alternate structure for beam member 12 is illustrated in FIG. 3. Referring now to FIG. 3, a modification of the beam member 12 is shown which removes the necessity of a biasing or spring member passing through shank portion 23. A suitable passage 33 is provided passing through end portion 24 of member 12 on a slanting basis with its outer opening adjacent the juncture of end portion 24 and shank portion 23. A spring member 34 is positioned in passage 33 so that one end thereof abuts washer 30. At the other end, passage 33 is provided with a threaded portion 35 in which an adjusting screw 36 fits in order to vary the compression on spring member 34. By this modification the shank portion 23 may be made as thin as desired for more desirable flexural characteristics. In this connection, the cross section of the beam members, i.e., shank 23, may have a rectangular, elliptical or other shapes both regular and irregular.

Various other arrangements of supporting a suitable rolling element in contact with a material to be tested may be employed within the scope of this invention. Furthermore, various alternate means may be employed for biasing the rolling element or varying the compression on the springs 29 and 34. In each instance the arrangement should be that which will be suitable for a clear indication of rolling friction to be obtained and that sliding friction of the ball against adjacent parts be known or taken into consideration.

Three similar beam members 12, 13 and 14 are positioned in the annulus 11 in equal peripheral spaced relationship, i.e., 120° apart. While more or less beam members may be employed, the preferred form of this invention employs three such beam members as illustrated because three or more points determine a plane and a planar measurement is desirable in this invention where the normal forces exerted on a circular cross section of a wire or rod are equally exerted between three balls. However, one or more elements may be employed such as for example a single rolling element preferably in combination with a back up member which may also roll.

In one practice of this invention, a coated electrical wire 37 thus passes axially through the ring 11, as illustrated in FIG. 1, and between balls 15, 16 and 17 and under controlled speed conditions. The values for compressive forces on springs 29 are adjusted to provide rolling of the balls because of rolling friction between the balls and the coating 38 on the wire. Variances in the rolling friction because of different states of cure of the coating causes flexural stresses in beam members 12, 13 and 14 along their longitudinal axes and in the fore and aft direction in the plane of a paper. This flexure is an indication of, for example the state of cure of the insulating material coating on the wire. Irregularities in the wire configuration undergoing test do not materially affect the accuracy of this device. Constant tension spring 29 permit the balls to move vertically with respect to the beam so that the ball may rise or fall with irregularities in the wire and beam bending is minimized.

To provide an indication of the stress or bending moments in beams 12, 13 and 14 each beam includes stress or flexure detecting means, which in a preferred form of this invention comprises a suitable wire strain gauge affixed to the portion of the beam where the bending moments are the greatest. These strain gauges 39, 40 and 41 are then connected preferably in series, as one resistance of a conventional wheatstone bridge circuit designated as block W in FIG. 1. The resistance change caused by bending of beams 12, 13 and 14 is thus indicated by the usual voltmeter in the bridge circuit. The unbalanced current condition as indicated by the voltmeter may then feed into an amplifier A if necessary for suitable amplification. Thereafter, control means such as a thermostat or suitable solenoid valve V located at some station upstream of the station at which rolling friction is sensed may be operated in response to the amplified signal from amplifier A to change the variables of time and/or temperature or other parameter to change the state of cure corresponding to the measurement obtained by the testing device of this invention. For example, the co-efficient of rolling friction of a steel hemisphere on silicone rubber has been found to vary linearly with respect to the state of cure of the silicone rubber. The standard or desired state of cure is thus proportional to the signal output. Thus, if the signal is not up to the standard a suitable servomechanism type of control is energized to change the curing time or the curing temperature, etc.

This invention is widely applicable to the testing of various other materials both metals and non metals where the principle of rolling friction being dependent on dynamic losses of the material is applicable. As such, the material may include various exterior configurations in addition to circular such as rectangular strips, geometric surfaces such as pentagons, hexagons, etc., and various combinations of arcuate and planar surfaces both regular and irregular.

While a specific method and apparatus in accordance with this invention is described and shown, it is not intended that this invention be limited to the particular description nor to the particular configurations illustrated, and it is intended by the appended claims to cover all modifications within the spirit and scope of this invention.

What we claim as new and desire to secure by Letters Patent of the United States is:

1. A testing device comprising in combination:
   (a) a support member,
   (b) a rolling friction element retained by said support member and adapted to have rolling contact with a specimen to be tested,
   (c) signal means operatively connected to said support member to provide a signal which varies with changes in rolling friction between said element and said specimen, and
   (d) indicating means operatively connected to said signal means to indicate material characteristics of the specimen to be tested.

2. A material testing device comprising in combination:
   (a) a plurality of support members,
   (b) a rolling friction element retained in each of said support members and adapted to have rolling contact with a material to be tested which passes between said rolling friction elements,
   (c) signal means operatively connected to said support members to provide a signal which varies as a function of changes in rolling friction between said elements and said material, and
   (d) an indicating means operatively connected to said signal means to indicate material characteristics of the material to be tested.

3. A material testing device comprising in combination:
   (a) a plurality of support members arranged in a common plane,
   (b) a rolling friction element retained in each of said support members and adapted to have rolling contact with a material to be tested passing between said rolling friction elements,
      (1) the plurality of friction elements being in juxtaposition about the material being tested with equiangular displacement between the points of contact of adjacent rolling friction elements and the surface of said material, (c) signal means operatively connected to said support members to provide a signal proportional to rolling friction between said elements and said material, and (d) an indicating means operatively connected to said signal means to indicate material characteristics of the material to be tested.

4. The invention as recited in claim 3 wherein said plurality of support members comprise three peripherally spaced members spaced 120° apart.

5. A detection and control device comprising in combination:
(a) a plurality of support members,
(b) a rolling friction element retained in each of said support members and adapted to have rolling contact with process material passing therebetween,
(c) signal means operatively connected to said support members to provide a signal which varies as a function of changes in rolling friction between said elements and the process material, and
(d) process control means responsive to said signal means to control at least one process parameter to change at least one characteristic of the process material.

6. A process detection and control device comprising in combination:
(a) a support member,
(b) a rolling friction element retained by said support member and adapted to have rolling contact with a material being processed,
(c) electrical signal generating means operatively connected to said support member to provide an electrical signal which varies with changes in rolling friction between said element and said material, and
(d) means responsive to said signal to control at least one parameter of the process being practiced on the material.

7. A wire coating production control device comprising in combination:
(a) an annular support member,
(b) three beam members supported by said annular support member substantially in a common plane in equal peripherally spaced relationship of 120° and extending towards the center of said annulus with the distal ends thereof in juxtaposition,
(c) a rolling friction ball element retained in the distal end of each of said support members and adapted to have rolling contact with a coated wire passing between said rolling elements,
(d) an electrical signal generating means operatively connected to each of said support members to provide an electrical signal varying with changes induced in the bending moments in said beams by rolling friction between said elements and said coated wire, and
(e) control means responsive to said electrical signal to control at least one parameter of the coating operation.

8. A method of controllably producing predetermined characteristics in a material during the conduct of a process step thereon wherein a plurality of process parameters are subject to control comprising the steps of:
(a) detecting changes in rolling friction between said material and a rotatable element at a station downstream of the station at which the process step is conducted,
(b) generating a signal which varies with changes in the rolling friction, and
(c) utilizing said electrical signal to control at least one parameter of said process to conform said parameter to predetermined standards for the surface characteristics of the material being subjected to the process.

References Cited by the Examiner

UNITED STATES PATENTS

| | | | |
|---|---|---|---|
| 2,023,665 | 12/35 | Clayton | 18—2 |
| 2,340,673 | 2/44 | Lotz et al. | 264—40 |
| 2,378,614 | 6/45 | Zahn | 73—9 |
| 2,481,326 | 9/49 | Miller | 264—40 |
| 2,765,441 | 10/56 | Gambrill | 18—2 |
| 2,820,987 | 1/58 | Bunch | 264—40 |
| 2,990,713 | 7/61 | Heffelfinger et al. | 73—9 |
| 3,033,019 | 5/62 | Oliver | 73—9 |

ALEXANDER H. BRODMERKEL, *Primary Examiner.*